(12) United States Patent
Cook

(10) Patent No.: US 10,830,655 B2
(45) Date of Patent: Nov. 10, 2020

(54) METHOD AND APPARATUS FOR PERFORMING FIELD ELONGATION MEASUREMENTS

(71) Applicant: Bradley Wayne Cook, Frisco, TX (US)

(72) Inventor: Bradley Wayne Cook, Frisco, TX (US)

(73) Assignee: e-Longation, LLC, Plano, TX (US)

( * ) Notice: Subject to any disclaimer, the term of this patent is extended or adjusted under 35 U.S.C. 154(b) by 48 days.

(21) Appl. No.: 16/229,583

(22) Filed: Dec. 21, 2018

(65) Prior Publication Data

US 2019/0226927 A1 Jul. 25, 2019

Related U.S. Application Data

(60) Provisional application No. 62/764,051, filed on Jul. 15, 2018, provisional application No. 62/709,458, filed on Jan. 19, 2018.

(51) Int. Cl.
| | |
|---|---|
| *G01L 5/105* | (2020.01) |
| *G01L 5/04* | (2006.01) |
| *E04C 5/12* | (2006.01) |
| *E04G 21/12* | (2006.01) |

(52) U.S. Cl.
CPC .............. *G01L 5/105* (2013.01); *E04C 5/122* (2013.01); *E04G 21/121* (2013.01); *G01L 5/047* (2013.01); *E04G 21/12* (2013.01)

(58) Field of Classification Search
CPC ....... G01L 5/105; G01L 5/047; E04G 21/121; E04G 21/12; E04C 5/122
See application file for complete search history.

(56) References Cited

U.S. PATENT DOCUMENTS

| | | | |
|---|---|---|---|
| 4,805,877 A | 2/1989 | Hoekstra | |
| 4,808,958 A | 2/1989 | Hewitt | |
| 4,851,771 A | 7/1989 | Ikeda | |
| 5,623,804 A | 4/1997 | Kelly et al. | |
| 6,240,699 B1 | 6/2001 | Scanlon | |
| 6,470,636 B1 | 10/2002 | Rose | |
| 6,684,585 B2 * | 2/2004 | Campbell | E04C 5/08 403/2 |
| 6,928,029 B2 | 8/2005 | Rickman | |
| 7,075,626 B2 | 7/2006 | Schmidt | |
| 9,267,795 B2 | 2/2016 | Frank | |

(Continued)

FOREIGN PATENT DOCUMENTS

| | | |
|---|---|---|
| CN | 204038960 U | 8/2014 |
| JP | 2016075073 A | 5/2016 |

OTHER PUBLICATIONS

Carol Hayek and Thomas H.-K. Kang, "Elongation Tolerance for Short tendons in Post-Tensioned Building Structures," (Trade Publication), Title No. 11-S64, ACI Structural Journal, Jul.-Aug. 2017, pp. 795-802.

(Continued)

*Primary Examiner* — Jonathan M Dunlap

(57) ABSTRACT

An improved method and apparatus for evaluating post-tensioning tendons, where the apparatus uses a positioning head placed directly into the pocket and against the anchor without making contact with the wedges as the apparatus seats on the tendon. From this position the apparatus evaluates the tendon by marking, measuring the tendon, and/or determining its location with increased reliability and precision.

20 Claims, 9 Drawing Sheets

(56) References Cited

U.S. PATENT DOCUMENTS

| | | | |
|---|---|---|---|
| 2002/0088105 A1 | 7/2002 | Nutzel | |
| 2002/0178665 A1* | 12/2002 | Campbell | E04C 5/12 |
| | | | 52/223.13 |
| 2012/0266441 A1 | 10/2012 | Parente | |
| 2013/0140509 A1 | 6/2013 | Domage | |
| 2014/0016114 A1 | 1/2014 | Lopez | |
| 2015/0300021 A1* | 10/2015 | Hayes | G01B 3/28 |
| | | | 33/700 |
| 2015/0330077 A1 | 11/2015 | Stracke | |
| 2017/0037622 A1 | 2/2017 | Sorkin | |

OTHER PUBLICATIONS

Russell L. Price, "Frequently Asked Questions, Field Elongation Measurements", (Trade Publication), Answers from the PTI Unbonded Tendons Committee, Post Tensioning Institute, Jul. 2007, Issue No. 6, pp. 1-8.
State of California, Department of Transportation, "Prestress Manual, a guide for field inspection of cast-in-place post-tensioned structures" (Manual), Jan. 2005, Rev. Mar. 2005, pp. 20-29, and 57-73.
Young, Lee W., International Search Report for PCT/US 18/67246, dated Jun. 28, 2019, USPTO as International Search Authority.

* cited by examiner

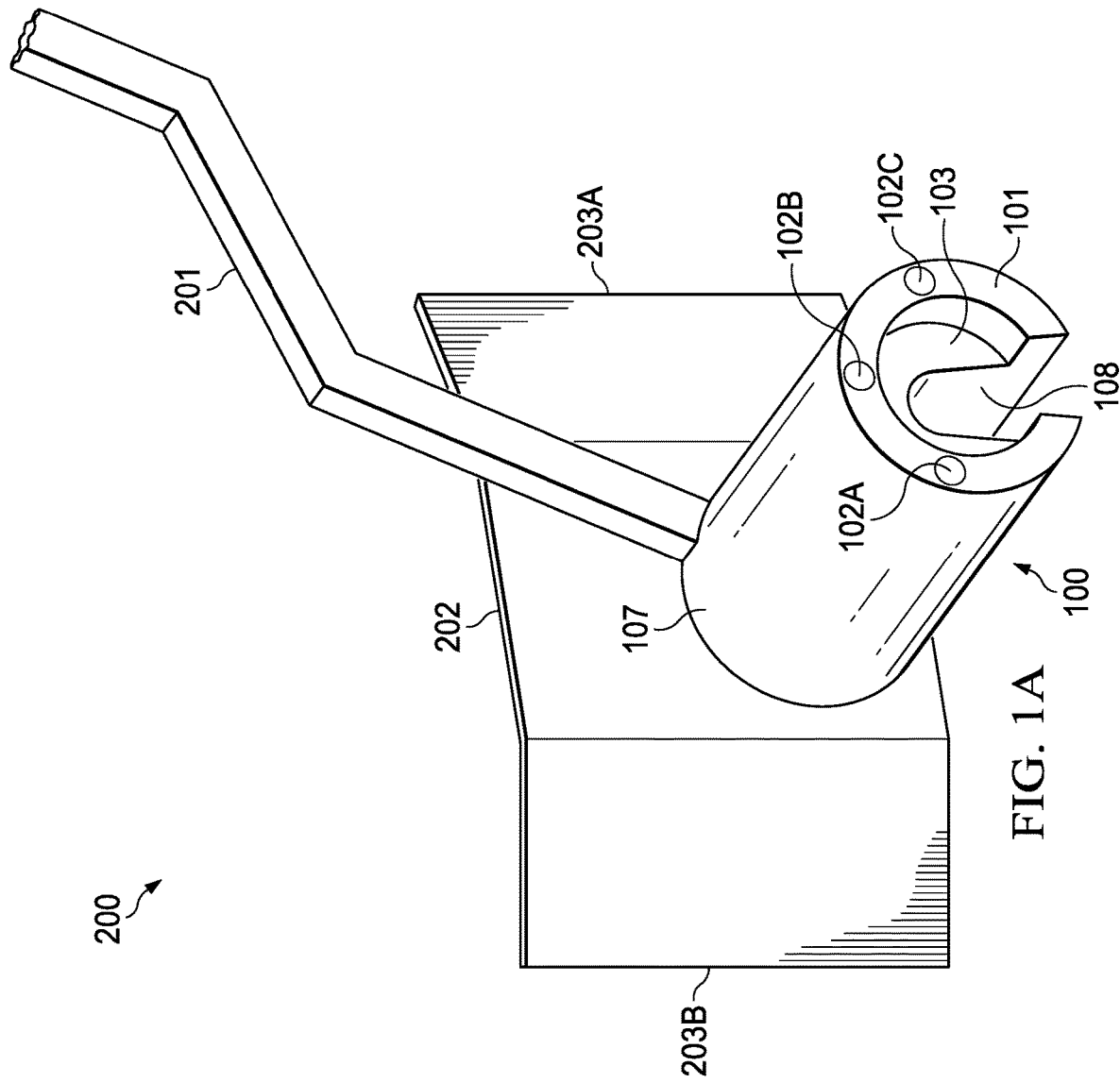

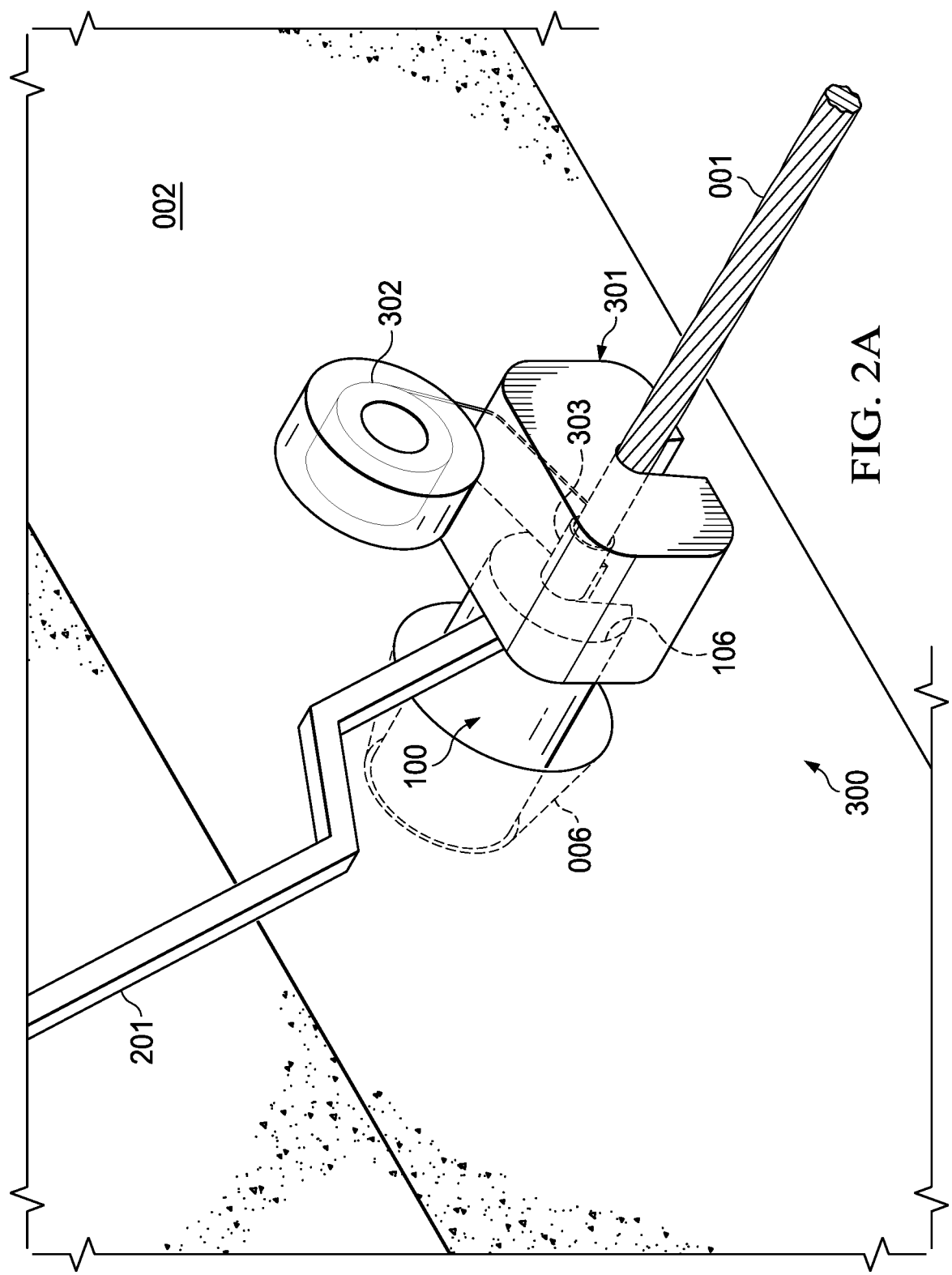

METHOD AND APPARATUS FOR PERFORMING FIELD ELONGATION MEASUREMENTS

PRIORITY TO RELATED APPLICATIONS

This application claims the benefit of U.S. Provisional Patent Application No. 62/709,458, filed Jan. 19, 2018, which is incorporated by reference herein in its entirety; this application also claims the benefit of U.S. Provisional Patent Application No. 62/764,051, filed Jul. 15, 2018 which is incorporated by reference herein in its entirety.

TECHNICAL FIELD

The present invention relates in general to post tensioning concrete construction and in particular to the measurement of the elongation of post tensioning tendons.

BACKGROUND INFORMATION

Post-tensioning construction is a method for reinforcing concrete with steel cables. Steel reinforced concrete is a composite material with greater strength against sheer forces than traditional concrete, and can be made even stronger if the steel reinforcement is stressed in a manner to apply counter forces against anticipated building loads.

In post-tensioning construction relaxed steel tendons are set into a concrete casting before the concrete is poured. Post-tensioning tendons are enclosed in plastic sheaths that are filled with grease and tightly wrapped or cast around the tendons to protect against corrosion and prevent fixation to the concrete. A tendon has freedom of lateral movement within its sheath until both ends of the tendon have been locked into their anchors. The sheathed tendons are placed or fixed within a pre-formed concrete casting area at locations and in geometries designed to exert the desired forces after the concrete has set and tendons are tensioned. These tendons are typically arranged to distribute compressive forces in, prevent cracking of, and counteract all loads expected to be placed on the structure.

One end of the tendon may be set into an anchor fixed to the casting form so that the tendon will not exit the concrete casting area; an end anchored in this way is referred to as a "dead end." The tendons are set into the anchor by setting a plurality of semi-conical gripping devices, called "wedges," around the tendon and seat in the anchor. The wedges are locked-in to an anchor when proper gauge pressure is applied.

Alternatively, an end of the tendon may be initially left with a 'tail' extending through its anchor and beyond the casting form for later tensioning; such an end is referred to as a "live end" or "stressing end." Longer tendons will often have both ends as live or stressing ends.

When the concrete is poured the sheathed tendons within the casting form become completely surrounded by concrete with only the live end tails exposed. The anchors are cast into and mostly surrounded by the concrete with a portion of its outer surface exposed inside a "pocket" of negative space created by a plastic pocket former set into the exterior face of the concrete structure. The tail of the live end of the tendon extends from the concrete structure. When the concrete has set, the casting form and pocket former are removed and grease is wiped off of the exposed tendon in preparation of the marking process (to be discussed below). The stressing end is "pre-set" with wedges which sit around the tendon and partly into the anchor. The pre-set wedges will lock-in, and fully seat into, the anchor during tensioning when a sufficient tension is applied. Until the wedges are locked-in they partially extend out of the anchor and may extend outside of the anchor after full seating.

After the concrete has set to acceptable strengths, the desired tension as measured in kips is loaded onto the tendon. This is typically done by means of a hydraulic jack, referred to interchangeably as "jack" or "ram." A number of jacks are available on the market such as the device disclosed in U.S. Pat. No. 4,805,877. The tendon can be either "prestressed" with a partial load (generally 30%) within 24 to 72 hours of the pour, or fully loaded with tension after the concrete has set for 7 to 10 days or otherwise achieved the specified minimal concrete strength. The ram fits its nosepiece into the pocket and grips the cable with its teeth. The ram pulls the gripped tendon against the wedges located within the anchor to load the tendon with the desired force (approx. 33 Kips). The ram presses against the wedges which are pushed forward into the anchor. The jack applies the desired amount of force as measured out (in kips) on a recently calibrated meter or gauge. Ideally, this measured amount of force is transferred into the tendon and, as the tendon attempts to relax, on into the concrete.

However, several reasons prevent the ram's gauge from reliably indicating the force transferred into the tendon. These reasons include but not limited to: seating loss; creep; anchorage strain; improper gauge calibration; damaged tendons; defective tendon materials; abnormal amounts of friction which may result from fixation to the concrete or from insufficient seating; and human error. Due to these and other risks, field elongation measurements have become a standard quality control procedure and are required by professional and industry organizations such as the Post Tensioning Institute.

Field elongation measurements are generally performed as follows: Prior to tensioning, a reference mark is made on the tendon 'tail' on each live end' outside of the pocket area. This mark is made by placing a guide, normally a 2×4 board, against the exterior face of the concrete which assures that the mark is placed lateral to the point at which the ram will grip the tendon. Using the guide as reference, a mark is made on the tendon with spray paint or other methods. Once this reference mark has been made and wedges have been preset in the anchor, the ram loads the tendon with a desired amount of tension. This displaces the mark from its initial position by a distance equal to the tendon's elongation. The ram is then removed and a guide of equivalent length, preferably the same guide used to make the initial mark, is placed against the face of the concrete and the distance from the edge of the guide to the reference mark is measured with an L-square type ruler.

The equation for calculating the theoretical elongation of a tendon is well understood in the field. Third-party elongation measurements are taken and reviewed against theoretical values. Deviations from the theoretical value can indicate that the tendon was loaded with an insufficient amount of tension or that the tendon is damaged or defective. If there is a discrepancy between the theoretical (usually 0.078" per foot of tendon) and observed values, and it is greater than an acceptable threshold (normally 7% to 10%), then the structural engineer will require a site revisit to confirm that the field elongation report itself is not user error. If the report is confirmed to be free of transcription and measurement errors or the discrepancy otherwise persists, then the engineer may order a lift-off test and or re-pull to confirm the elongation of the problem tendon. This test is rarely performed a third time because the act of tensioning can lead to loss of tension, and because the tensioning process is not entirely nondestructive on the tendon, as the teeth of the wedges can harm the tendon on each pull and reseating of its wedges.

Due to the nature of post-tension construction, there are generally a large number of tendons within the concrete structure that are stressed at any given time. All elongation measurements tend to be taken at once, with the results hand written onto a datasheet which is later can be transferred manually to digitized form and sent to the engineer for review. Transcription errors, measurement errors, out of sequence reporting errors and one-off omissions are common and lead to review of tendon elongation delays pending a second site visit to attempt to clerically fix the elongation report before it can be reviewed by the engineer of record.

A problem with current methods is caused by the lack of a standard guide. It is common for the reference guide used during the marking step to be different from the device used when measuring. This difference can result from using different axes of the same guide or by incorrectly assuming that two different guides share common lengths; as variation commonly occurs between nominally sized 2×4 boards.

An additional problem with current methods results from imperfections or angles in the exterior face or rim of the concrete at the pocket. The rim of the tendon pocket is not perfectly flush and some edges of the rim can extend nearer or farther from the plane of the concrete than others. As a result, the mark created by the guide will be different depending on which edge of the pocket the guide is placed against.

An additional problem with current methods comes from the small interface between a flat guide and a round tendon. The interface between the paint guide and the tendon is small and results in a diffuse mark that is crisp only on its top-most part. The tendons are greased and if not properly cleaned, the grease can deform the mark. The risk of the mark becoming unreadable continues to increase with the time between when the mark is made and the final review of the elongation.

The current testing process is time intensive and requires a site re-visit when errors occur or if restressing is required. The errors are generally not discovered until after the testing team has left the project site and often require a second site visit before work can proceed.

SUMMARY

As a solution to these and other problems with the existing methods, the present invention is an improved method and apparatus for performing field elongation measurements. In its current embodiments the apparatus is split into multiple operative parts referred to as devices such as the 'marking device' and the 'measuring device.' References to the operative parts as devices should not be read as a limitation of the invention. Nothing generally requires the operative parts of the apparatus to be embodied as physically separate devices in situations where context does not otherwise require it.

Before using the apparatus, the form, pocket void and grease must be wiped off and cleared of debris. The apparatus includes a standardized positioning head (preferably 4 inches in length) is placed directly into the pocket, around the tendon, and makes multipoint magnetic contact with anchor. The head has a channel running through its center which fits over and seats onto the tendon. The head has a depression set into its anchor-end, designed to fit around and avoid contact with the wedges which are pre-set in and partially extending from the anchor.

The contact surface of the head connects with the anchor at multiple points which assures that the head runs perpendicular to the anchor and seats flush with the tendon. This contact is confirmed by a flush contact detector such as a magnetic contact. When the head has made flush contact with the anchor and the tendon seats against the top of the channel, the remainder of the apparatus becomes aligned into proper position with respect to the anchor and tendon.

The marking devise comprises the positioning head and a marking tool. The marking device is used to create a reference mark defining the transverse plane where the tendon exits the caudal edge of the head. The mark is made a standardized distance (preferably 4 inches) from the anchor by any non-destructive marking means, such as a spray paint and shield or by securing an encoded identification tag or tape to the tendon.

The tendon is then loaded with tension by a standard means such as a ram type device. The ram must grip, or otherwise apply tension to, the tendon at a point medial to the reference mark and lateral to the anchor. Once tension is loaded on to the tendon, the anchor and the wedges seat together to prevent the tendon from relaxing.

The measuring device includes the positioning head and a measuring tool. The measuring device's positioning head is designed to be proportionally identical to the head of the marking device. This symmetry guarantees that the measuring device seats over the tendon, into the pocket, makes flush contact with the anchor and holds the same position as that of the positioning head on the marking device. The caudal plane of the measuring device is identical to the caudal plane used to set the reference mark.

The preferred version of the measuring device has its positioning head connected to a spine which, in turn, is connected to a measuring body. In this embodiment, the spine is attached to the positioning head of the measuring device and passes through the measuring body in such a way as to allow the body to slide laterally along the spine. The bottom of this version of the measuring body has a seating channel which allows the body to seat onto the tendon. While the head of the measuring device maintains contact with the anchor the body has freedom to slide laterally along the tendon and the spine. During operation, the body will slide along the tendon until its cranial edge is directly above the reference mark. Once in position the measuring device determines the elongation by measuring the distance between the reference mark's current and original positions.

The present invention solves many problems associated with prior methods. The standardized head of the apparatus, by making contact directly with the anchor, bypasses problems associated with marking the tendon from a point defined by the outer-rim of the pocket. Other post-tensioning tools interact with the pocket but these tools either secure themselves against the anchor by applying tension to the tendon and/or push against or otherwise interact with the wedges. The preferred version of the marking device makes contact with the upper half of the surface of the tendon leaving a crisp mark over at least 40% of the tendon's circumference, improving on the small, unclear and diffuse marks made by prior methods.

Some versions of the measuring device include an optional means of determining its location at the time of each measurement. In these versions, an antenna located at the cranial edge of the measuring body is used to determine the location of the measuring device when a measurement is made. The location of the measuring device may be determined by any commercially available measurement method such as GPS or a triangulation system. This version of the measuring device will confirm the identity of the tendon being measured by comparing its location at the time of measurement to known locations of tendons. The elongation data collated with a tendon identification code and saved to the measuring device. This data file will be transferred to a computer or a substantially similar device and used to generate an elongation report that ties the more accurate elongation dimensioned to the exact identified tendon reducing a major source of human error.

BRIEF DESCRIPTION OF DRAWINGS

For a more complete understanding of the present invention and the advantages thereof, reference is now made to the following descriptions taken in conjunction with the accompanying drawings, in which:

FIG. 1A is a perspective rear-side view of an embodiment of a marking device illustrating the general orientation of its parts.

FIG. 2A is a perspective side view of an alternative embodiment of marking device with a partial wire-frame view of the interior, illustrating the general orientation of parts and placement.

DETAILED DESCRIPTION

Figure 1B:
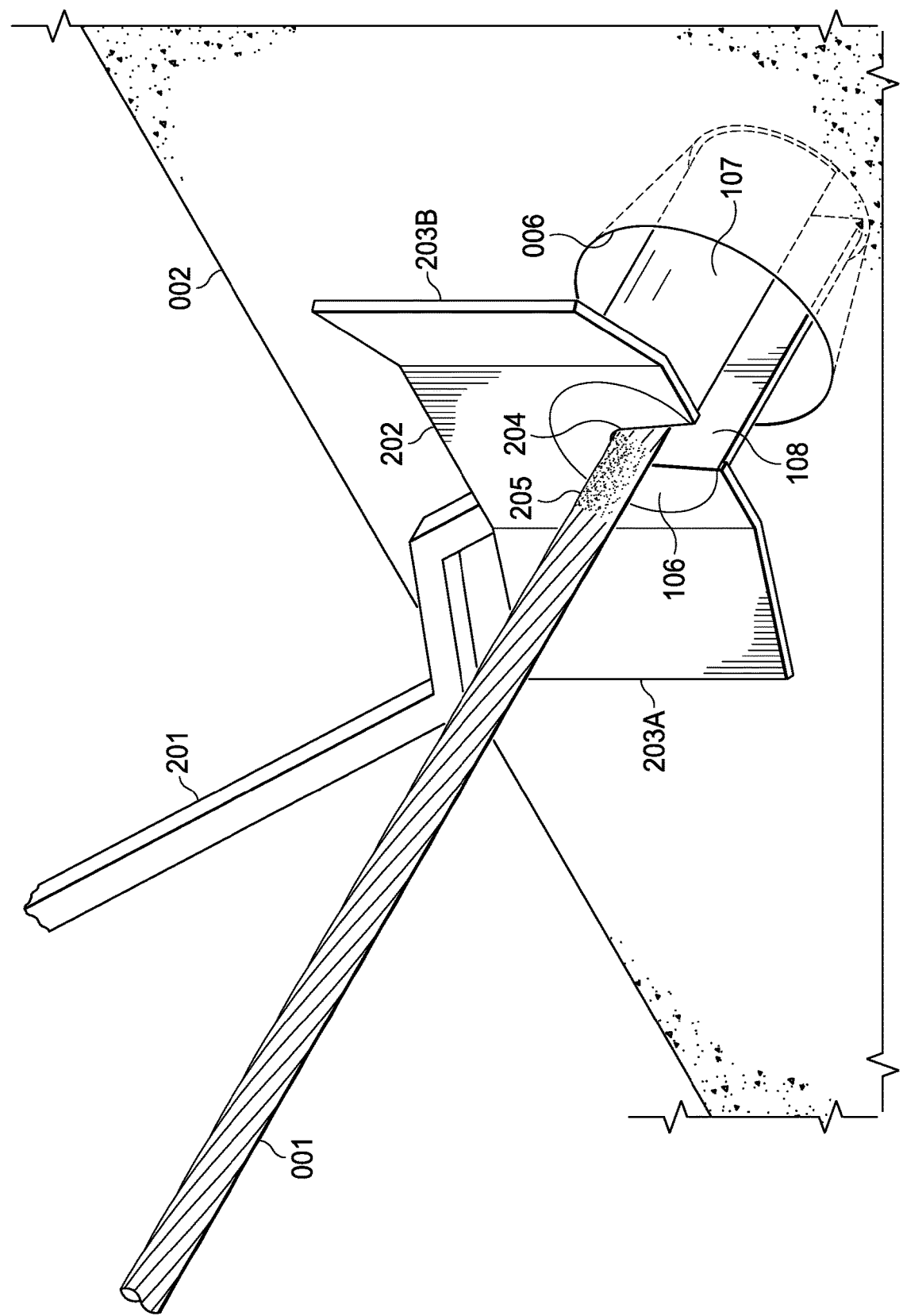
FIG. 1B is a perspective front-side view of an embodiment of the marking device showing placement around a tendon.

In the Summary above and in the Detailed Description of the invention, as claimed below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article comprising (or "which comprises") components A, B, and C can consist of (i.e. contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1.

Anatomical terms are used to indicate the position of various structures, surfaces, and elements. The terms "superior" and/or "cranial" refer to parts being close to or approaching the head of a device with the superior or cranial-most portion of a device being the anchor-side contact surface. The terms "inferior" and/or "caudal" refer to parts away from or in the direction away from the head. The term "lateral" refers to portions of the device or tendon moving away from the center of said device or tendon. The lateralmost portion of the tendon is the extreme tip of the tail. The term "medial" refers to the portion of the device or tendon tending towards the center of the device or tendon. The medialmost portion of the tendon is in the center of the concrete structure. The terms "top," "upper" and/or "dorsal" refers to portions of the device or tendon that are in the direction of the antenna, handle, display or base station. The terms "lower," "bottom" and/or "ventral" refer to portions of the device that are generally away from the direction of the antenna, handle, display or base station. The term "transverse plane" describes a plane separating the cranial and caudal surfaces. The term "longitudinal" axis refers to the axis running through the length of the object. The term "substantially" when used to modify the similarity or equality of two or more values, features, or elements is meant to include similar values, features, or elements whose substitution would not fundamentally change the function of the initial value, feature, or element as understood by a person of ordinary skill in the relevant art.

The principles of the present invention and their advantages are best understood by referring to the illustrated embodiments of the apparatus depicted in attached drawings, in which like numbers designate like parts. In the following description, well-known elements are presented without detailed description in order not to obscure the present invention in unnecessary detail. For the most part, details unnecessary to obtain a complete understanding of the invention have been omitted in as much as such details are within the skills of persons of ordinary skill in the relevant art.

Positioning Head

Figure 3:
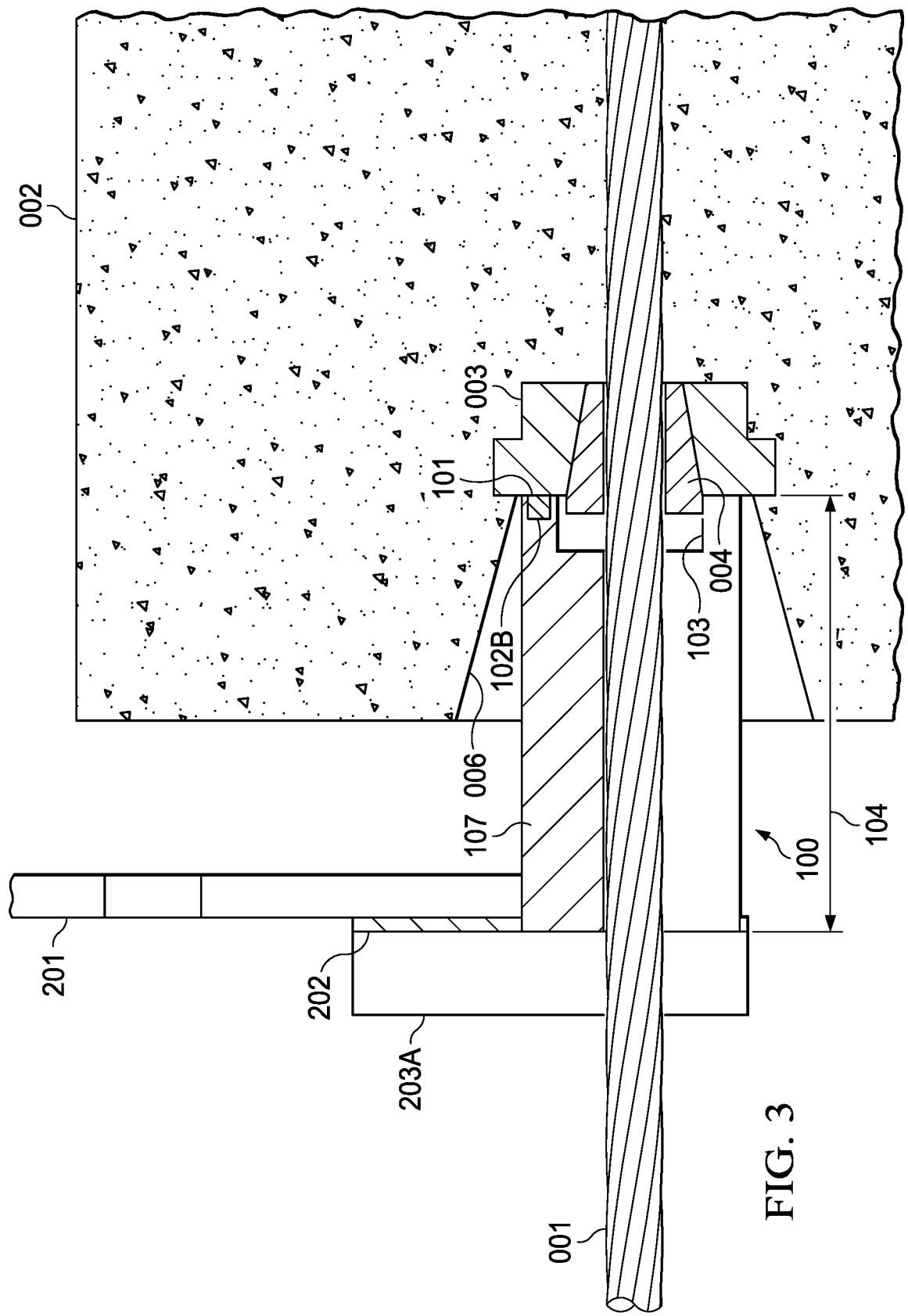
FIG. 3 is a sectional view of a marking device showing the placement and operation of the positioning head within the pocket.
Figure 4A:
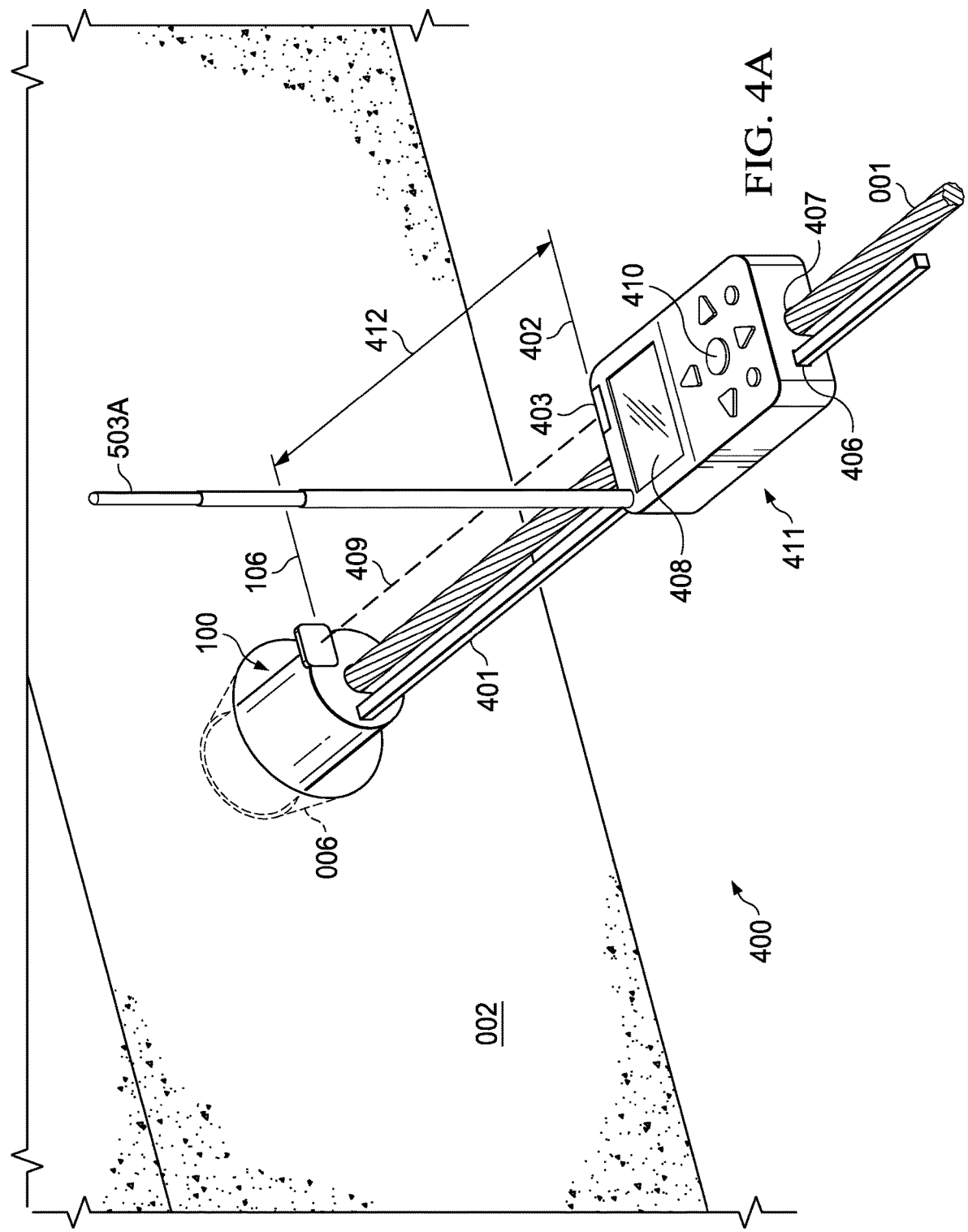
FIG. 4A is a perspective side view of a measuring device illustrating the general orientation of parts within the pocket.

A standardized positioning head ("head") 100 is common to the operative parts of the apparatus referred to as a marking device 200 and a measuring device 400. With reference to FIGS. 3 and 4A, the head 100 of the measuring device must be identical to the head 100 of the marking device. The positioning head of the marking device has the same component elements, detectors, geometry, dimensions and connects to the anchor in the same way as the positioning head in the measuring device.

With reference to FIGS. 1A and 3, the head is of a standardized length (preferably 4 inches) 104 and comprises a channel 108, a contact surface 101, one or more flush-contact detectors 102A and a wedge pocket 103. The contact surface 101 is defined as the flat surface at the cranial most portion of the head. The contact surface 101 either consists of, or is inset with, one or more flush-contact detectors

102A, 102B, 102C. The flush-contact detector may be any physical, mechanical, or electronic mechanism which informs its user when coplanar contact has been made between the contact surface of the positioning head and the anchor without applying tension to the tendon. The wedge pocket 103 is a depression set medially into the cranial surface of the head-body 107 of a sufficient recessed depth (preferably ½ inch) to allow the contact surface to make flush contact with the anchor without the head making contact with a set of wedges 004 which must be in the anchor. As stated in the background section, the 'pre-set' wedges will partially extend out of the anchor and may continue to protrude from the anchor even after they are 'locked in' to the anchor with gauge pressure; in either case, the wedges will be enclosed by the wedge pocket without the making physical contact with the head (see FIG. 3).

The preferred version of the head comprises a cylindrical head-body 107 and a "U" shaped channel 108 set into its ventral surface designed to seat around a tendon 001. The head-body in this embodiment is made of a hard plastic which will not deform with use, but any substantially similar material may be substituted. When the head is in proper position, the tendon seats against the top on the channel and the contact surface makes flush contact with an anchor 003 (see FIG. 3). In this position, the contact surface will be perpendicular to the tendon's longitudinal axis. The preferred version of the flush-contact detector is one or more permanent magnetic surfaces set substantially coplanar with the contact surface of the head, in such a way as to assure that the head makes flush contact with multiple points on the anchor. When in use, the contact surface makes flush multipoint contact with the anchor 003 as confirmed by the flush-contact detector or detectors (see FIG. 3).

FIG. 1B further shows the preferred embodiment of the channel 108 of sufficient size and depth to seat around the tendon 001 coaxially so that the dorsal surface of the channel makes contact with at least 40% of the upper surface of said tendon within the channel the remainder of the channel flaring outwards. While the preferred embodiment has the channel, as shown, continuing through the ventral surface of the cylindrical head-body, nothing inherently prohibits the channel from being completely enclosed by the head-body. As discussed in the embodiments below, the head is attached to a tool member such as a marking or measuring tool. During operation the proper placement of the head with respect to the anchor and tendon assures proper alignment of the tool member and its workpiece.

Marking Device

FIGS. 1A and 1B show a version of the marking device 200 in isolation and placed within a pocket 006 of a concrete structure 002. The marking device comprises the standardized positioning head and a means for nondestructive creating a reference mark on the tendon. The preferred embodiment of the marking device is shown comprising the standardized positioning-head 100 connected to an optional handle 201 and a paint shield 202. The optional handle 201 is shown secured to the dorsal surface of the head 100 for ease of operator use.

FIGS. 1A and 1B show the paint shield 202 is attached to the head 100 in such a way that the caudal surface of the paint shield is coplanar with the caudal surface of the head 106. The paint shield comprises a surface connected to the caudal surface 106 of the head designed to direct spray paint (not shown) along the interface 204 of the tendon 001 and the caudal edge of the channel of the head 108. The paint creates a reference mark 205 in the transverse plane defined by the interface 204, preferably covering at least 40% of the tendon's circumference within this plane creating a large, clear reference mark. FIGS. 1A and 1B show optional wings, attached at oblique angles to the shield 203A, 203B oriented so as to direct paint onto the tendon and capture diffuse paint.

Measuring Device

Figure 4B:
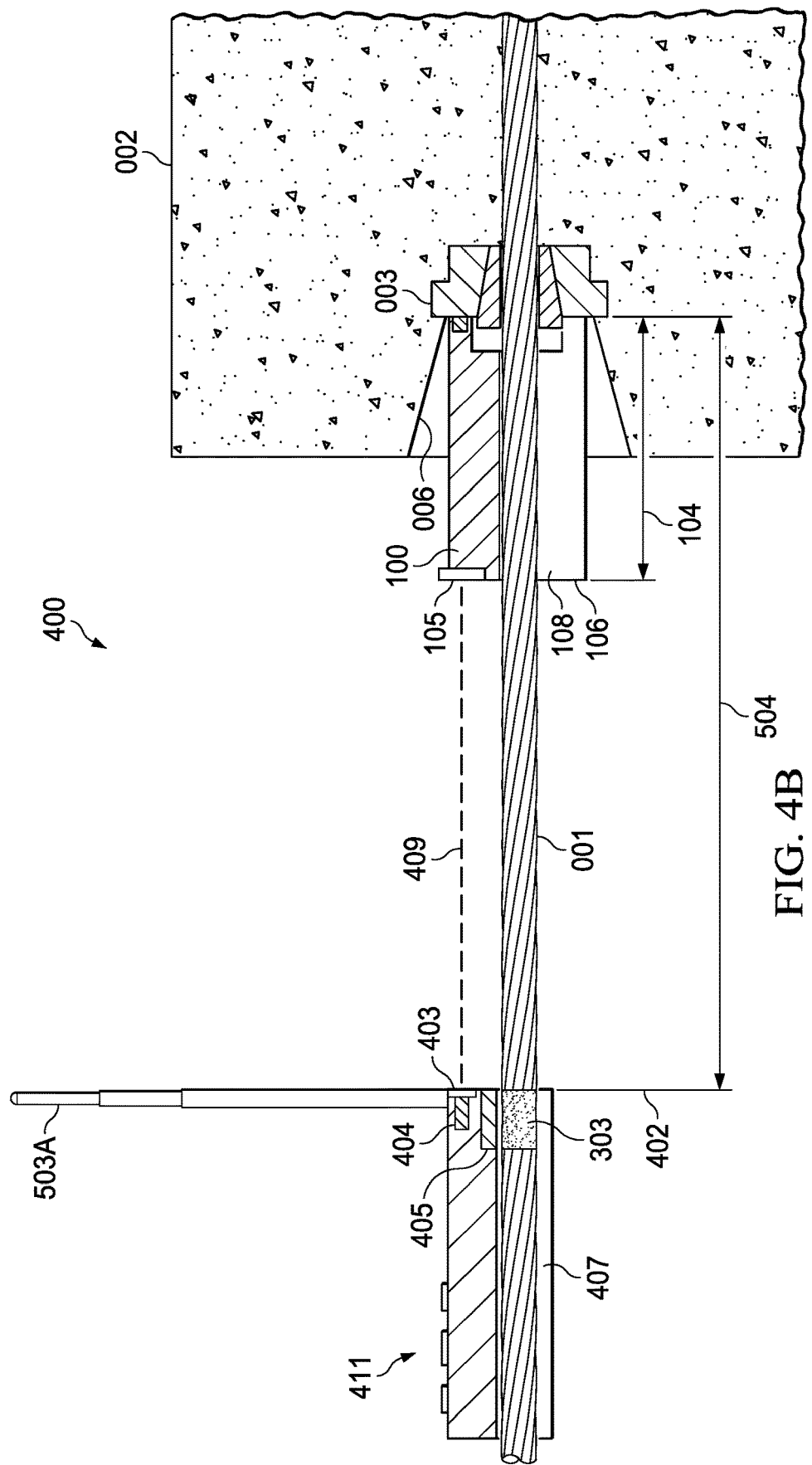
FIG. 4B is a sectional view illustrating the proper placement and use of a measuring device.

The measuring device comprises the positioning head and means for determining the linear distance of the reference mark and the caudal surface of the head. With reference next to FIGS. 4A and 4B which show perspective and sectional views of the preferred embodiment of the measuring device 400 comprising the positioning-head 100 and a measuring body 411 connected by a rigid rectangular spine 401 running laterally though a rectangular pathway 406 in the measuring body parallel to the channel 108 of the head. FIG. 4B shows a version of the measuring body housing an eye unit 403. The spine may be encoded with information and made of steel, aluminum, plastic or any other substantially similar material that will not lose its shape. In this embodiment, the spine 401 is fixed into the caudal surface 106 of the positioning-head and passes inside and through an enclosed rectangular pathway 406 running laterally through the measuring body 411 in such a way as to permit the measuring body freedom to slide back and forth along the spine while prohibiting rotation so as to remaining in-line with the tendon.

In this embodiment of the marking device, the caudal surface 106 of the head-body is attached to the spine 401 as well as a measuring target 105. The measuring target is set into or otherwise coplanar with the caudal surface of the positioning head.

FIGS. 4A and 4B further show how this version of the measuring device has a "U" shaped channel ("body-seating channel") 407 set into the ventral surface of the measuring body. The body-seating channel 407 is in line with; has the same dorsalmost point as; and has a substantially similar shape as the channel 108 set into the head 100. FIGS. 4A and 4B show how the measuring body 411 seats onto the tendon 001. The body has the freedom to slide laterally along the tendon and spine without rotating so as to remain in-line with the head. During operation the head remains connected to the anchor, as confirmed by the flush-contact detector or detectors, while the measuring body slides along the tendon.

The measuring device's tool for measuring linear displacement, as covered extensively in the alternative embodiments, may use any known technique that can measure the distance between the cranial edge of the measuring body and the reference mark 205. The preferred version of the measuring device comprises the eye unit 403 set into the cranial surface of the measuring body 411. The eye unit is a device which determines linier distance by emitting and receiving a signal and interpreting the results and may incorporate any number of known measuring devices which are commercially available, for example: Bosh GLM 400 CL, Leica DISTO E7100i, Stanley TLM99S or Laser MTI DTS-300-200.

The preferred version of measuring body additionally comprises a signal processing module 404 housed within the measuring body which is adapted to process, interpret and manipulate data from the eye unit and other tools discussed in the alternative embodiments. This version of the measuring body additionally comprises a memory for storing observations a display 408, for the measuring device to communicate with operator and a plurality of buttons 410 for operator capture and navigating through data stored in the measuring device's memory. The module, memory, display, buttons and are electronically connected to the eye unit.

An optional version of the measuring device additionally comprises a telescoping antenna 503A extending from the cranial edge 402 of the body for communication with a base station 501. The telescoping antenna is of sufficient length to reach the level of the base station set discussed below.

Base Station

Figure 5A:
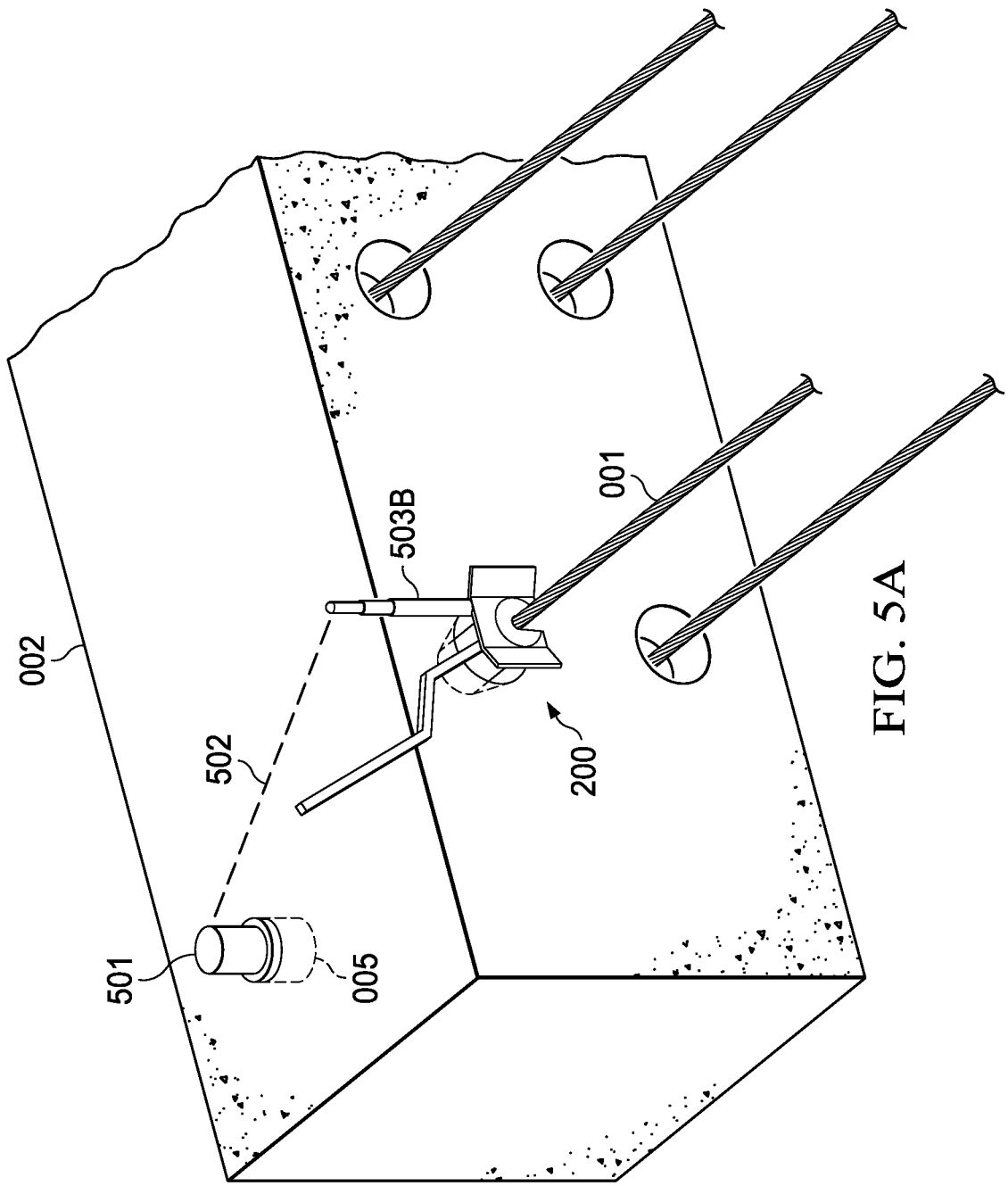
FIG. 5A is a perspective view of an optional base station determining the position of an alternate embodiment of the marking device.
Figure 5B:
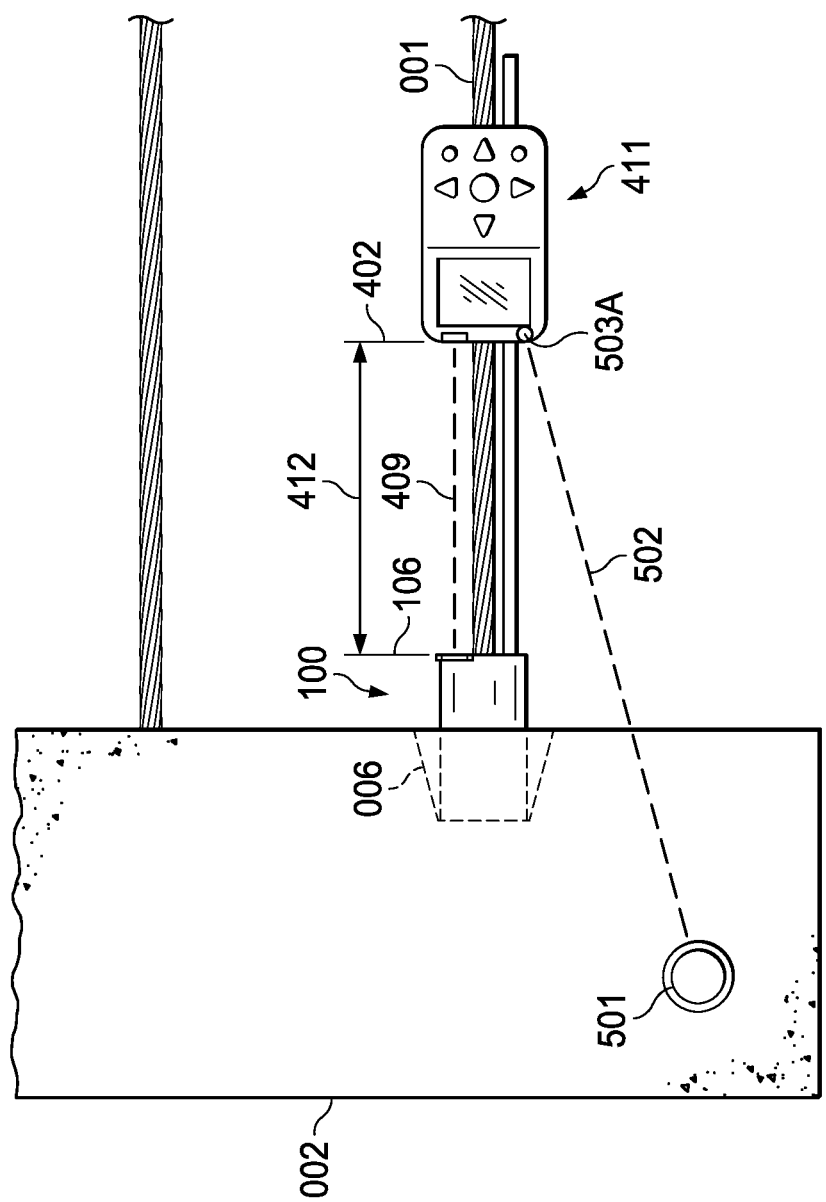
FIG. 5B is an elevation view of an optional base station shown determining the position of an embodiment of the measuring device.

FIGS. 5A and 5B show an optional base station 501 which will be used in conjunction with certain versions of the measuring device for determining the position of the measuring device at the time a measurement is made. In this embodiment, the base station is set into a depression 005 cast into the concrete structure 002 and its location recorded in a representational map. The distance between the fixed position of the base station and the tendons 001 may be calculated from site specific installation drawings. The base station emits and/or receives signals which may be used to measure a distance between the base station and the antenna of the measuring device 502. When the telescoping antenna 503A of the measuring device is raised to a known height above the measuring device, preferably the horizontal plane of the base station, the measuring device measures its position from the fixed base station.

Operation

The above disclosed apparatus is used in the following manner to perform field elongation measurements with improved accuracy and minimal user error.

After the concrete 002 is cast and before the tendons 001 are stressed, the tendons are wiped down and the pocket is cleared of debris. The wedges 004 are pre-set around the tendon and partially into anchor 003. Next the head of the marking device 200 is placed into the pocket 006, around the tendon 001, and against the anchor 003 so that it's contact surface 101 makes flush-contact with the anchor as confirmed by the flush-contact detector or detectors 102A, 102B, 102C and avoids contact with the wedges 004 as the dorsal surface of the tendon makes contact with the dorsal surface of the channel of the head 108 (see FIGS. 3 and 4B). The operator may need to manually lift the relaxed tendon to maximize the interface 204 between the tendon and the channel and assure that the tendon is in the same position as it will be after it has been loaded with tension. In this position the tendon will exit the head at a standardized distance (preferably 4 inches) 104 lateral from and perpendicular to anchor which, itself, is parallel to the caudal surface 106 of the head. The operator will then mark the tendon at the plane defined by the caudal edge 106 of the positioning head. In the preferred embodiment, the operator will apply spray paint to the interface 204 of the tendon as previously discussed.

The tendon 001 is then loaded by traditional methods such as a hydraulic jack (not shown) as described in the background section.

The head of the measuring device 100 is placed into the pocket, 006 around the tendon, 001 and against the anchor 003 so that the contact surface 101 makes flush contact with the anchor as confirmed by the flush-contact detector or detectors 102A, 102B, 102C. The head makes flush contact with the anchor without making contact with the wedges 004, which are enclosed in the wedge pocket, 103 as the channel of the head 108 and the seating-channel of the measuring body 407 seat over and rest on the tendon (see FIG. 4B). With the head in place, the target 105 of the measuring device is located in the same transverse plane 106 and the same distance from the anchor 104 as the initial reference mark made prior to elongation 106.

The operator, without breaking the contact between the head and the anchor, slides the measuring body 411 along the tendon until the cranial edge of the measuring body 402 is directly over the reference mark. The measuring body remains in line with the head as it slides along the spine 401 and the tendon 001 maintaining a straight-line path 409 between the eye unit 403 and the target 105. When the measuring body is in position the measuring device will initiate a data capture of the elongation measurement. The data capture may be manually initiated when the operator presses a capture button 410 or may be an automatic process. The captured data may be saved to the memory of the measuring device. Optionally, the measuring device will determine both the length of the elongation and the identity of the tendon being measured and collate the results by storing the values as a single observation.

When performing a measurement, the preferred embodiment of the measuring device sends a signal in the path 409 from the eye unit 403 on the measuring body to the target located on the head 105. This signal is reflected off of the target and back into the eye unit. The distance between the eye and the target 409 is the same value as the length of the elongation 412 (see FIG. 4A). This distance value becomes part of the data stored as a captured observation to the memory of the device.

In the preferred embodiment, the base station 501 is used to determine the location of the measuring device at the time of measurement. This location capture is optional, but if the base station is used, it must first be engaged and placed in a fixed position, preferably into the depression set into in the concrete structure 002, and calibrated with the antenna 503A of the measuring device. This calibration sets the reference location from the base station and starting point of all located tendons. The measuring device will determine its position with sufficient accuracy to identify the tendon being measured at the same time as it determines the length of the elongation. This optional location step may be performed by GPS-type satellite location, or by interacting with the base station at its known location. FIGS. 5A and 5B show the base station 501 which send a signal to the telescoping antenna 503A set into the cranial edge of the measuring device. The antenna should be extended to a known height above the edge of the concrete 002, preferably the same height as the base station 501. The measuring device will determine by the strength of the signal from the base station it's linear distance 502 to the antenna.

In this optional location step, the distance from the antenna to the base station 502 and the distance from the eye unit to the anchor 504 are compared to a representational map of the locations of the tendons. This representational map can digital or be tabular in nature and populated from site specific installation drawings. The representational map can be downloaded to the device's memory. Each tendon that will be tested is identified and given a tendon identity code. The tendon identity code is associated with a location in physical space. Tendons with two live ends will need to have elongation measured on both live ends; such tendons will be given an identify code for the physical location of each live end with both observed elongations summed and saved as the elongation value for the tendon identity code of the tendon as a whole. At the time of capture the measuring device may use its observed distance from the base station 502 and its observed distance to the target 002 added to the standardized head length 104 triangulate the distance from the anchor to the base station. This value is compared to the values in the representational map and used to determine the tendon's identity code. The identity code becomes another part of the data stored as a captured observation.

After data is captured, the measuring device may visually show the captured observation on the display 408. The measuring device will continue to store additional observations to memory which can be exported via a computer or similar device such as a cellphone application to a cloud-based platform for real-time remote viewing and commenting.

As the invention aims measure the linear displacement of tendon elongation from the relaxed, pre-stressed and post stress states, the invention and its operative device(s) can be operated in any alternative method which measures the linear displacement of the tendon elongation. For example, an alternative operation of the invention measures the distance from the caudal surface of the head to the lateral most point of the tendon ("the tail tip"), with the tail tip serving as the reference mark. In this alternative operation, the distance from the caudal surface of the head and the tail tip are measured and recorded a plurality of times by the measuring device for each live end. At least one head-to-tail-tip measurement is made before tensioning occurs and at least one additional head-to-tail-tip measurement is made after the tension has been loaded. The pre-elongation measurement(s) are subtracted from the post-elongation measurement(s) to determine the linear displacement of the tendon elongation.

Although the present invention has been described in considerable detail with reference to certain preferred versions there are other versions that are possible for example:

An alternative embodiment of the flush-contact detector will comprise a push-button-type contact sensor which will depress when the head is in proper position with respect to the anchor and tendon. In which the physical depression of one or more contact-type sensors will electronically indicate that the head is flush with the anchor. The flush-contact detector in the positioning head may be wired into the marking or measuring device to indicate electronically that the head is in proper position. The indication may be visual, though a light or display 408, or audible such as a beep or tone.

Another alternative embodiment of the flush-contact detector would include two electrical contacts set into the contact surface at opposite sides of the channel. When the head is in proper position against the metal anchor, the contacts will complete an electrical circuit to verify flush contact has been made with the anchor.

An additional embodiment of the marking device includes a housing for pressurized spray paint connected to the caudal surface of the paint shield. The ventral end of the housing having a nozzle for spraying paint onto the tendon. This embodiment includes a mechanical member for transferring pressure applied at the handle, such as a lever or tension line, to depress the nozzle of the spray paint housing. This embodiment eases operator use by allowing him or her to remotely release paint onto the interface between the paint shield and tendon with one hand and without stooping.

An additional embodiment of the marking device will incorporate a grip for a marker such as a grease pencil, stamp, paint brush, or other nondestructive marking member located on the caudal surface of the paint shield. This embodiment includes a means of transferring pressure applied to its handle, such as a lever or tension line, to press the marker against the interface between the paint shield and the tendon.

An additional embodiment of the marking device will additionally comprise a telescoping antenna 503B of sufficient length to reach the height of the optional base station (see FIG. 5A), a power source (not shown), and an operator control (not shown). Prior to use, the base station 501 must be engaged and calibrated with the antenna of the marking device to determine the reference location from the base. This embodiment will send a signal from its antenna to determine the marking devices using commercial GPS or any standard measurement techniques known in the relevant art to identify the location of the marking device with respect to the concrete structure. The operator will send this signal at the time that the mark is made on the tendon. This embodiment of the base station will determine the tendon identity code and the time of capture. This data will be stored as a record that the reference mark has been made with the correct marking device at the correct tendon.

Figure 2B:
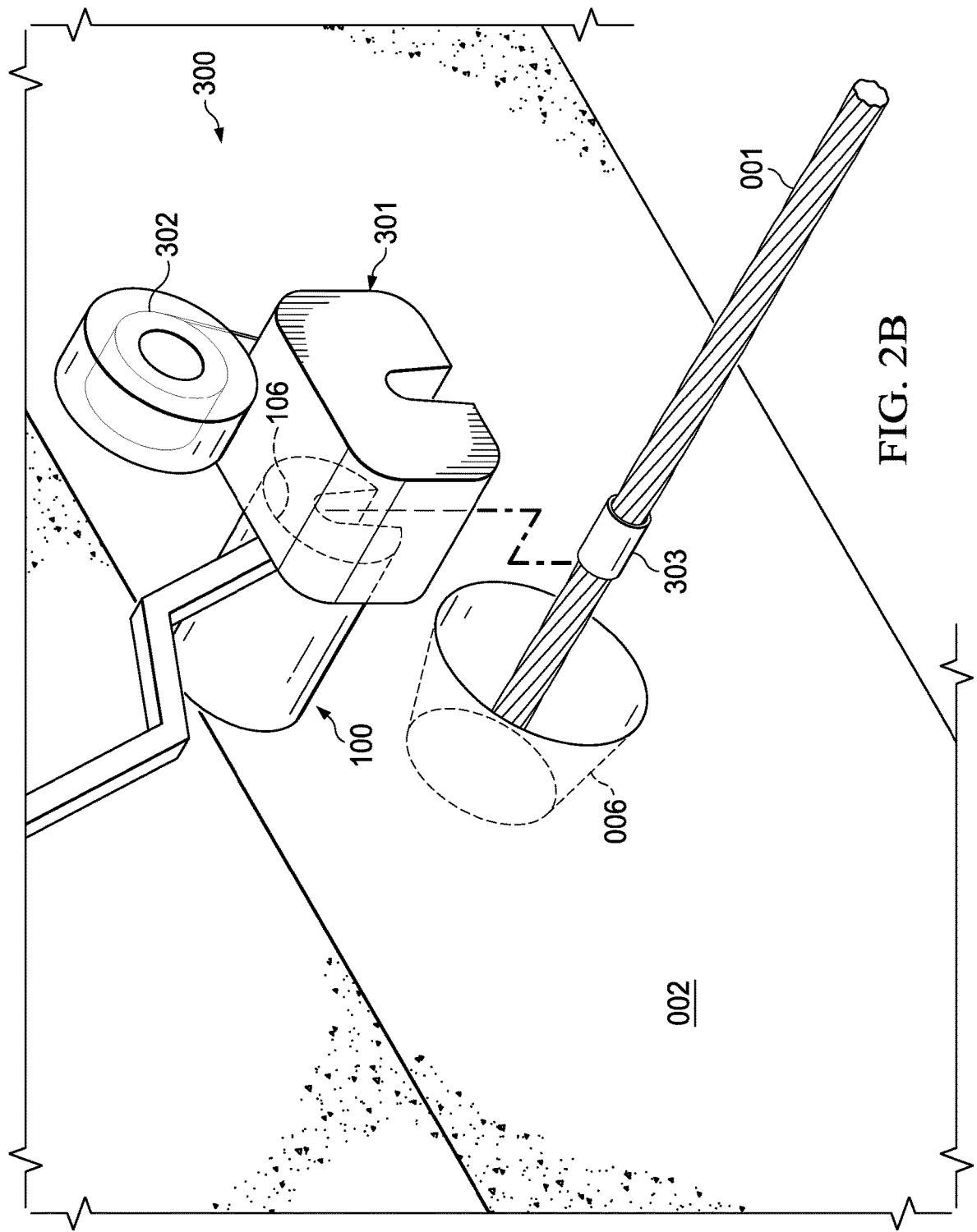
FIG. 2B is a perspective side view of the alternative embodiment of marking device with a partial wire-frame view of the interior, illustrating the proper placement of the device and id-tag or tape.

An alternative embodiment of the marking device 300 can be seen in FIGS. 2A and 2B. This version will additionally comprise a tagging body 301 attached to the caudal surface 106 of the head 100. The tagging body will house a plurality of id tags or tape 302 and will position and secure an id tag to the tendon so that the cranial edge of the tag is against the caudal surface of the head 106 to serve as the reference mark. This mark will be made before the tendon is stressed. This embodiment will operate by placing an id tag 303 from the tagging body 301 and secure it to the tendon 001 by means of a tensioning member, a heating element, or an adhesive member so that the fastened tag does not have any loose material unsecured to the tendon. The id tag is not limited to any material and may be constructed from tape, sticker or coating. The id tags may additionally encode location information in the form of optically encoded patterns such as bar codes or information in the form of induction antenna such as RFID. Many codes of this type are known in the relevant art and are commercially available. The cranial edge of the id tag must be placed at the caudal edge of the head. The cranial edge of the tag will act as reference mark for the measuring device.

An alternative embodiment of the measuring device will further comprise a sensor 405 for reading information encoded onto id tags. An embodiment of such a device is shown in FIG. 4B, with the sensor is shown embedded in the ventral side of the measuring body 411, within the channel 407, and towards the cranial edge of the measuring device 402. The sensor is electronically connected to the display, buttons and signal processing module. In this embodiment the sensor is oriented so as to focus on the id tag when the cranial edge of the measuring body is placed over the cranial edge of the tag 303 as shown in FIG. 4B. The sensor may be optical for optical-type tags or may include an emitter and receiver for induction antenna type tags. While the sensor 405 in the version of the measuring device shown in FIG. 4B locates the sensor on the ventral side of the measuring body the sensor may be located anywhere on the apparatus. The information encoded in such tags will be stored as part of the data observed when the operator initiates a data capture.

An additional embodiment of the sensor 405 may be use the sensor to determine when the cranial edge 402 of the measuring device is properly placed over the reference mark. The sensor may be in any other location that enables it to identify that the cranial edge of the measuring device is in proper position over the mark. The sensor may be optical and adapted to focus on the line directly under the cranial edge of the device. When such a sensor detects differences in light reflected off the marked 205 and non-marked portions of the tendon 001 or otherwise determines that the device is in proper position, the marking device will either automatically capture the elongation and location data or will visually or audibly prompt the operator initiate the capture.

In an alternative embodiment of the sensor 405 comprises a commercially available measuring device such as a linear encoder which reads scale references coded along the spine. Linear encoders are well known in the art and are commercially available, for example Balluff BML06HN.

An additional embodiment of the measuring device, the sensor 405 is a liner variable differential transformer (LVDT) sensor to determine the distance from the head to the measuring body. The LVDT sensor may be incorporated directly into the measuring body and can used to determine the distance from the cranial edge of the measuring body and caudal surface of the head by the currents induced by the change to the measuring body's positions as it moves along the spine. These sensors and the electronics behind them are well known in the industry. A number of commercially available tools such as Omega LVDT Sensor # LD310-250 from TE Connectivity. Current provided by the LVDT is used to generate a length value which can be displayed to the operator and saved to the measuring device's memory upon capture.

An additional embodiment of the measuring device the sensor will comprise a cog or sprocket located within the spine passage 406 within the measuring body 411, the teeth of which interact with depressions in the spine 401 as the measuring body is moved back and forth from the head. As the cog or sprocket is rotated the angular displacement is stored as tension in a spring or charge on a capacitor in proportion to the distance the measuring body has traveled from the head. This is translated into a measurement of distance which can be displayed and captured. These types of measuring devices are well known in the art and are commercially available.

In an additional embodiment of the measuring device the eye unit 403 will comprise a laser triangulation-type sensor. In this embodiment a laser within the eye unit will emit a signal, which will reflect off of the target, and into a collection lens adjacent to the emitter within the eye unit. The collection lens directs the light at a known angle into a linear detector. The position of the focused light received by the linear detector is used to determine the length from the eye unit to the target. This type of range finding method is well known in the art.

An additional embodiment of the measuring device will further comprise a means of confirming that it is horizontally level such as a bubble level or an accelerometer.

An additional embodiment of the measuring device comprises a graduated ruler as the rectangular spine. The ruler may be used to confirm measurements made by other means, or may be visually observed and entered into the measuring body manually by the operator.

An additional embodiment of the measuring device replaces the rigid spine and passage with a telescoping spine for ease of use and storage.

An alternative embodiment of the measuring device will use its antenna to communicate with commercially available location systems such as cellular triangulation or satellite systems such as GPS to determine the position of the cranial edge of the measuring body. This location method can supplement or replace other optional location methods as well as used to identify coarse location data (e.g. the location site). Course location data may be supplemented by fine location data (e.g tendon identity code) manually entered by the operator corresponding to tendon identity codes for double and single live end tendons on the representational map. Manually entered data can be checked against directional data provided by an optional compass built into the measuring device to assure accuracy. The location data will be compared to the known locations of the tendon for the purpose of tendon identification.

An alternative embodiment of the apparatus will comprise one or more base stations set into an additional depression(s) in the concrete structure to triangulate the location of the antenna of the measuring device. These base stations synchronize with each other and determine the times at which they receive signals as sent by the measuring device. These times are compared with each other are used to determine the location of the other devices. The location of the device as determined by the distance between the two stations is recorded and sent to the measuring device to determine the time of the final stress and the identity of the tendon being measured.

An additional embodiment of the optional base station device will include a spool type tape measure dispenser. This tape measure can be drawn from the base and used to measure the distance from the base station's position to the antenna or cranial edge of the measuring device. This may be used to confirm or calibrate other measuring methods or may be visually observed and entered into the measuring body manually by the operator.

Therefore, the spirit and scope of the appended claims should not be limited to the description of the preferred versions contained herein.

The above disclosed method and apparatus improves over and answers the problems associated with previous methods and devices. The positioning head ensures that all measurements are made from the same plane by measuring from the anchor and use a uniform reference mark. The head avoids contact with the wedges, makes flush contact with the anchor, and ensures the tendon is properly seated in the channel. The marking device makes a much larger mark which is more resistant to smearing and distortion by increasing the area of interface between the tendon and the paint guide. The measuring device and method capture multiple datapoints which ensure accuracy greatly reduces the problem of time delay in discovering errors and elongation discrepancies by allowing data to be uploaded in real time. This enables the engineer of record to review trustworthy field elongation data instantly allowing for real time response. This real time rejection or approval opens up the possibility the finalization steps (cutting, priming, capping and grouting) to occur within hours instead of days. This protects the integrity of the structure by dramatically decreasing the time that the tendons, anchor and wedges are exposed to the elements.

I claim:

1. An apparatus for positioning and evaluating a post-tensioning tendon enclosed by a set of wedges and preset in an anchor set within a pocket of a concrete structure, comprising:
    a positioning head having a head-body with a contact surface and a caudal surface;
    a flush contact detector;
    a wedge pocket; and,
    a channel having an upper surface,
    wherein, the contact surface is adapted to make multipoint contact with the anchor, said flush contact detector is attached to said contact surface and is adapted to confirm multipoint contact with the anchor, the wedge pocket is recessed into the cranial side of the head-body and is of sufficient size so as is to enclose the preset wedges without the head making contact with said preset wedges, and the channel passes through the length of the head-body, and said channel is adapted to seat onto the tendon.

2. The apparatus of claim 1, in which the channel's upper surface is concave, the concavity of said upper surface matching the shape of the tendon, so that the upper surface of the channel makes contact with at least 40% of the portion of the tendon's surface within the channel.

3. The apparatus of claim 1, further comprising a marking member which is attached to the head-body and adapted to create a nondestructive reference mark on the tendon at a location coplanar with the caudal surface of the head-body.

4. The apparatus of claim 3 wherein said marking member comprises:
an id tag having a cranial edge,
a tagging body, housing the id tag, attached to the caudal surface of the head-body,
wherein said tagging body is adapted to place and secure the entirety of the id tag to the tendon so that the cranial edge of the tag is coplanar with caudal surface of the head-body.

5. The apparatus of claim 3, wherein said marking member is a paint shield attached to the head-body, said paint shield having a caudal surface substantially coplanar to the caudal surface of the head-body.

6. The apparatus as recited in claim 5 further comprising:
a handle attached to the head-body, and
a plurality of wings attached to the shield at oblique angles.

7. The apparatus of claim 5, wherein the apparatus is adapted so that the interface of the channel, the caudal surface of the head-body and the tendon is at least 40% of the tendon's circumference.

8. The apparatus of claim 1 further comprising a means of determining linear displacement, wherein said means is connected to the head-body.

9. The apparatus of claim 8 further comprising:
a spine attached to the caudal surface of the head-body, and
a measuring-body with a cranial edge,
wherein said measuring-body is attached to said means of determining linear displacement and attached to the spine so that the measuring-body has laterally freedom of movement.

10. The apparatus of claim 9, wherein the spine is a ridged rectangular shaft and the measuring body is formed so as to include a rectangular pathway and a body-seating channel, wherein said rectangular pathway runs laterally through the measuring-body and is adapted to receive the spine, and said body-seating channel is in line with the channel of the head and adapted to seat onto the tendon.

11. The apparatus of claim 9 wherein said means of determining linear displacement is an eye unit attached to the measuring body, and further comprises a target attached to and coplanar with the caudal surface of the head-body, wherein the eye unit is oriented towards the target and adapted so as to remain in line as the measuring-body moves along the spine.

12. The apparatus of claim 9, further comprising:
a display,
a button,
and a signal processing module,
wherein the display, the button and the module are attached to the measuring-body.

13. The apparatus of claim 12 which further comprising:
an antenna attached to the measuring body,
a means of determining the physical location of the antenna, and
a representational map of the physical location of the anchor.

14. The apparatus of claim 13 in which the means of determining the physical location of the antenna comprises a base station in communication with said antenna, wherein the base station is set into a depression in the concrete structure at a location recorded on the representational map.

15. The apparatus of claim 9 wherein said means of determining linear displacement is a sensor attached to the measuring body.

16. The apparatus of claim 15 in which the sensor is a liner variable differential transformer sensor.

17. The apparatus of claim 15 in which the sensor is a linier encoder.

18. A method of performing field elongation measurements of a post-tensioning tendon enclosed by a set of preset wedges and an anchor set within a pocket of a concrete structure, comprising the following steps:
marking the tendon with a nondestructive marking device positioned into the pocket of the structure so that the marking device makes flush contact with the anchor and rests on the tendon without making contact with the wedges;
loading the tendon with tension; and
measuring the tendon with a measuring device positioned into the pocket of the structure so that the marking device makes flush contact with the anchor and rests on the tendon without making contact with the preset wedges.

19. A method of performing field elongation measurements of a post-tensioning tendon enclosed by a set preset of wedges and preset in an anchor set within a pocket of a concrete structure, comprising the following steps:
measuring the elongation of the tendon with a measuring device comprising an antenna while contemporaneously determining the location of the antenna;
comparing the location of the antenna to a representational map;
identifying a tendon identity code associated with the location by referencing the representational map; and
storing the measured elongation collated with the tendon identity code.

20. The method of claim 19, further comprising the following step, transferring the collated measured elongation and identity code for real time remote review and response.

* * * * *